(12) United States Patent
Girard (10) Patent No.: US 8,730,246 B2
(45) Date of Patent: May 20, 2014

(54) REAL-TIME GOAL SPACE STEERING FOR DATA-DRIVEN CHARACTER ANIMATION

(75) Inventor: Michael Girard, Palo Alto, CA (US)

(73) Assignee: Autodesk, Inc., San Rafael, CA (US)

( * ) Notice: Subject to any disclaimer, the term of this patent is extended or adjusted under 35 U.S.C. 154(b) by 1112 days.

(21) Appl. No.: 11/833,890

(22) Filed: Aug. 3, 2007

(65) Prior Publication Data

US 2008/0273039 A1  Nov. 6, 2008

Related U.S. Application Data

(60) Provisional application No. 60/916,255, filed on May 4, 2007.

(51) Int. Cl.
*G06T 15/00* (2011.01)
*G06T 17/00* (2006.01)
*G06T 13/00* (2011.01)

(52) U.S. Cl.
CPC ............... *G06T 13/00* (2013.01); *G06T 17/00* (2013.01)
USPC ........... 345/474; 345/419; 345/420; 345/473; 382/103

(58) Field of Classification Search
CPC ...................................................... G06T 13/00
USPC .................... 345/419, 420, 473, 474; 382/103
See application file for complete search history.

(56) References Cited

U.S. PATENT DOCUMENTS

| | | | |
|---|---|---|---|
| 5,864,342 A | 1/1999 | Kajiya et al. | |
| 5,982,389 A | 11/1999 | Guenter et al. | |
| 5,999,195 A | 12/1999 | Santangeli | |
| 6,011,562 A | 1/2000 | Gange et al. | |
| 6,057,859 A | 5/2000 | Handelman et al. | |
| 6,126,449 A | 10/2000 | Burns | |
| 6,208,357 B1 | 3/2001 | Koga et al. | |
| 6,535,215 B1 | 3/2003 | DeWitt et al. | |
| 6,587,574 B1 | 7/2003 | Jeannin | |
| 6,608,624 B1 | 8/2003 | Wang | |
| 7,525,546 B2 | 4/2009 | Herbrich et al. | |
| 2001/0048441 A1 | 12/2001 | Mochizuki et al. | |
| 2002/0118194 A1 | 8/2002 | Lanciault et al. | |
| 2004/0012594 A1 | 1/2004 | Gauthier et al. | |
| 2004/0160445 A1 | 8/2004 | Whatmough | |
| 2005/0001842 A1 | 1/2005 | Park et al. | |
| 2005/0071306 A1 | 3/2005 | Kruszewski et al. | |

(Continued)

OTHER PUBLICATIONS

Heck et al., "Parametric Motion Graphs", ACM SIGGRAPH Symposium on Interactive 3D Graphics, 2007, pp. 1-8.

(Continued)

*Primary Examiner* — Jeffrey Chow
(74) *Attorney, Agent, or Firm* — Patterson & Sheridan, LLP (57) ABSTRACT

A method for generating real-time goal space steering for data-driven character animation is disclosed. A goal space table of sparse samplings of possible future locations is computed, indexed by the starting blend value and frame. A steer space is computed as a function of the current blend value and frame, interpolated from the nearest indices of the table lookup in the goal space. The steer space is then transformed to local coordinates of a character's position at the current frame. The steer space samples closest to a line connecting the character's position with the goal location may be selected. The blending values of the two selected steer space samples are interpolated to compute the new blending value to render subsequent frames of an animation sequence.

33 Claims, 6 Drawing Sheets

(56) References Cited

U.S. PATENT DOCUMENTS

| | | |
|---|---|---|
| 2005/0231512 A1 | 10/2005 | Niles et al. |
| 2006/0214934 A1 | 9/2006 | Foote |
| 2010/0002908 A1* | 1/2010 | Miyamoto et al. ............ 382/103 |

OTHER PUBLICATIONS

Heck et al., "Parametric Motion Graphs", Posters and Demos, Eurographics/ ACM SIGGRAPH Symposium on Computer Animation (2006), pp. 1-2.

Cooper et al., "Active Learning for Real-Time Motion Controllers", ACM Transactions on Graphics 26(3) (SIGGRAPH 2007). Aug. 2007, pp. 1-7.

Jerry Edsall, "Animation Blending: Achieving Inverse Kinematics and More", Gamasutra, Jul. 4, 2003, http://www.gamasutra.com/features/20030704/edsall_01.shtml, 20 pages.

Lau, et al., "Precomputed Search Trees: Planning for Interactive Goal-Driven Animation", Eurographics/ ACM SIGGRAPH Symposium on Computer Animation, 2006. Vienna, Austria.

Shin et al., "Fat Graphs: Constructing an Interactive Character with Continuous Controls", Eurographics/ACM SIGGRAPH Symposium on Computer Animation, Sep. 2006, pp. 291-298.

International Search Report, Aug. 28, 2008.

International Search Report, Sep. 4, 2008.

Wiley et al., "Interpolation Synthesis of Articulated Figure Motion," IEEE Computer Graphics and Applications, 1997.

Bruderlin et al., "Motion Signal Processing," 1995, ACM Press, New York, NY, USA, pp. 97-104.

Kwon et al., "Motion Modeling for On-Line Locomotion Synthesis," 2005, ACM Press, New York, NY, USA, pp. 29-38.

Rose et al., "Efficient Generation of Motion Transitions using Spacetime Constraints," 1996, ACM Press, New York, NY, USA, pp. 147-154.

Rose et al., "Verbs and Adverbs: Multidimensional Motion Interpolation Using Radial Basis Functions," IEEE Computer Graphics and Applications, 1998, Appl. 18, 5, pp. 32-40.

Kovar et al., "Flexible Automatic Motion Blending with Registration Curves," © The Eurographics Association, 2003, pp. 214-224.

Kovar et al., "Automated Extraction and Parameterization of Motions in Large Data Sets," ACM Transactions Graphics, 2004, 23, 3, pp. 559-568.

Office Action, U.S. Appl. No. 11/972,006 dated Feb. 1, 2011.

Laszlo et al., "Limit Cycle Control and It's Application to the Animation of Balancing and Walking," 1996, Proceedings of the 23rd Annual Conference on Computer Graphics and Interactive Techniques.

Rezk-Salama et al., "Interactive Exploration of Volume Line Integral Convolution Based on 3D-Texture Mapping," VIS '99 Proceedings of the Conference on Visualization '99, pp. 233-241.

Final Office Action dated Mar. 29, 2012 for U.S. Appl. No. 12/128,591.

Menardais, S., et al., "Synchronization for Dynamic Blending of Motions," In Proceedings of the 2004 ACM SIGGRAPH/ EuroGraphics Symposium on Computer Animation (Grenoble, France, Aug. 27-29, 2004), pp. 325-335.

Heck, R., et al., "Splicing Upper Body Actions with Locomotion," Computer Graphics Forum, 25: pp. 459-466, doi: 10.1111/j.1467-8659.2006.00965.x.

Office Action in U.S. Appl. No. 11/833,926, mailed Sep. 9, 2010.

Ashraf, G., et al. "Constrained framespace interpolation," Computer Animation, 2001. The Fourteenth Conference on Computer Animation. Proceedings, vol., No., pp. 61-72, 2001.

Office Action in U.S. Appl. No. 11/833,953, mailed Mar. 14, 2011.

Egges, A., et al., "Personalised real-time idle motion synthesis," Computer Graphics and Applications, 2004, Proceedings, 12th Pacific Conference on, Oct. 6-8, 2004, doi: 10.1109/PCCGA.2004.1348342.

\* cited by examiner

REAL-TIME GOAL SPACE STEERING FOR DATA-DRIVEN CHARACTER ANIMATION

CROSS-REFERENCE TO RELATED APPLICATIONS

This application claims benefit of U.S. provisional patent application Ser. No. 60/916,255, filed May 4, 2007, which is herein incorporated by reference.

BACKGROUND OF THE INVENTION

1. Field of the Invention

The present invention generally relates to computer software. More specifically, the present invention relates to a rendering application configured for steering an animated character, in real-time, toward a goal location where the character's motion is blended from a set of motion clips that form a data-driven motion space.

2. Description of the Related Art

The term rendering tool refers to a broad variety of computer-based tools used by architects, engineers, animators, video game designers, and other graphics and design professionals. Rendering is the process of generating an image from a model by means of computer programs. A rendering application may be used to render three-dimensional (3D) characters. These 3D characters may be animated by the rendering application.

A common feature of rendering applications is the ability to generate frames of an animation sequence in real-time. For example, the motion of a video-game character moving from one location in a graphics scene to another may be generated on the fly based on a game player's interaction with the game. To create a motion sequence, users of a rendering application typically begin with one or more motion clips from which the motion sequence is created. Often, motion clips are created using a motion capture system. Typically, a motion capture actor wears markers near each joint to identify the motion by the positions or angles between the markers. The markers are then tracked to sub-millimeter positions. Motion capture computer software records the positions, angles, velocities, accelerations, and impulses, providing an accurate digital representation of the motion.

Similarly, many game products include goal-driven characters that are not controlled directly by the player of the game. In the video game industry, these are called "non-player characters" or "NPCs". The most popular games (sports, role-playing, strategy, and first person shooters) make heavy use of NPCs to provide the key action elements in the game. Prior art techniques for controlling a non-player character's motion relied on a network of discrete motion clips with connected transitions that linearly blend from one clip into another clip. Motion transitions generated using this approach suffer from "motion artifacts" that cause the appearance of sliding, jumping, skipping, or other changes that look unnatural.

Creating realistic renderings of animated characters in real-time has proven to be challenging. Prior art techniques for controlling the motion of an NPC rely on a network of discrete motion clips with connected transitions that linearly blend from one clip into another clip. However, this approach often results in motion transitions that suffer from "motion artifacts" which cause the appearance of sliding, jumping, skipping, or other changes that look unnatural.

Creating game character motion that is engaging to game players and that appears realistic has proven to be difficult. Before this can happen, a game player must be able to see the character motion as being "alive" or "correct" without the mechanical motion artifacts that jar a player out of context. This problem of implausible motion is particularly apparent in animation sequences that show periodic motions, such as walking, running, or swimming.

Accordingly, there remains the need in the art for a technique for generating realistic animation sequences using real-time, goal space steering for data-driven character animation.

SUMMARY OF THE INVENTION

One embodiment of the invention provides a method for generating real-time goal space steering for data-driven character animation. A goal space table of sparse samplings of possible future locations is computed, indexed by the starting blend value and frame. A steer space is computed as a function of the current blend value and frame, interpolated from the nearest indices of the table lookup in the goal space. The steer space is then transformed to local coordinates of a character's position at the current frame. The closest steer space samples to the line connecting the character's position with the goal are selected. The blending values of the two selected steer space samples are interpolated to compute the final blending value which is applied to steer the character towards the goal.

Thus, advantageously, embodiments of the invention allow users to generate a realistic rendering of a character moving towards a goal in real-time. Further, embodiments of the invention may use a looping motion space for continuous goal-directed movement. Embodiments of the invention simplify both the design process and work required to create and modify renderings of real-time goal space steering for data-driven character animation.

DETAILED DESCRIPTION OF THE PREFERRED EMBODIMENTS

Embodiments of the invention provide a rendering application configured to generate an animation sequence or clip using goal space steering for data-driven character animation.

Generally, a goal is a target to which a character object depicted in an animation sequence desires to move. The goal can be either stationary or moving. The rendering application may generate an animation clip by rendering the character object, frame-by-frame, engaging in some form motion. For example, a human character may be rendered to appear to be walking, running, or jogging. In one embodiment, the motion is rendered from a set of motion clips that define a motion space.

Animation frames may be generated as a weighted blending of two or more motion clips included in the motion space. The rendering application may be configured to create animation sequences that steer the motion of a character object toward the goal. Periodically, the rendering application may identify an appropriate blending weight to steer the character towards the goal. By changing the blending weight, the rate and direction at which the character appears to turn while frames are rendered may be controlled. Further, in one embodiment, the motion clips may be part of a looping motion space, where a single rendering pass through the motion space generates an animation of the character performing a limited number of motion cycles (e.g., the human character taking four steps). The motion space is constructed so that the beginning and ending frames of the animation sequence generated by the rendering pass are substantially identical, allowing multiple passes through the motion space to be rendered without creating unrealistic visual artifacts.

Figure 1:
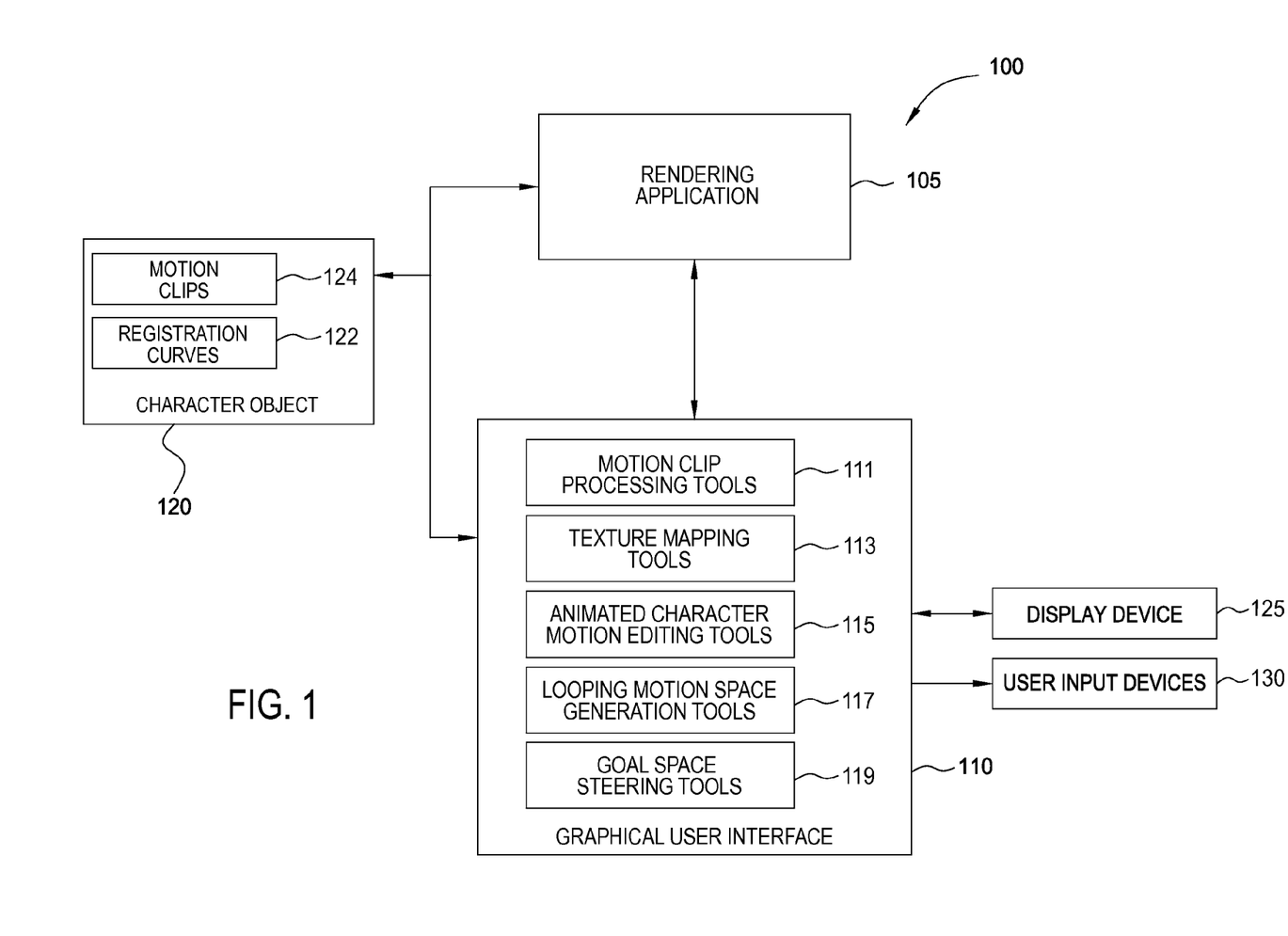
FIG. 1 is block diagram illustrating components of a rendering application used in real-time goal space steering for data-driven character animation, according to one embodiment of the invention.

FIG. 1 is block diagram illustrating components of a rendering application used in real-time goal space steering for data-driven character animation, according to one embodiment of the invention. The components illustrated in system 100 may include computer software applications executing on existing computer systems, e.g., desktop computers, server computers, laptop computers, tablet computers, video game consoles, and the like. The software applications described herein, however, are not limited to any particular computing system and may be adapted to take advantage of new computing systems as they become available.

Additionally, the components illustrated in system 100 may be implemented as software applications that execute on a single computer system or on distributed systems communicating over computer networks such as local area networks or large, wide area networks, such as the Internet. For example, a graphical user interface 110 may include a software program executing on a client computer system at one physical location communicating with rendering application 105 at another physical location. Also, in one embodiment, rendering application 105 and graphical user interface 110 may be provided as an application program (or programs) stored on computer readable media such as a CD-ROM, DVD-ROM, flash memory module, or other tangible storage media.

As shown, the system 100 includes, without limitation, rendering application 105, graphical user interface 110, character object 120, user input devices 130, and a display device 125. Those skilled in the art will recognize, however, that the components shown in FIG. 1 are simplified to highlight aspects of the present invention and that a typical rendering application 105 and GUI interface 110 may include a broad variety of additional tools and features used to compose and manage character object 120. Rendering application 105 may be configured to allow users interacting with GUI interface 110 to compose character object 120. Accordingly, rendering application 105 and GUI interface 110 may include programmed routines or instructions allowing users to create, edit, load, and save character objects 120. Typically, user input devices 130 include a mouse pointing device, a keyboard, or joystick or video game controller and display device 125 is a CRT or LCD display.

Illustratively, character object 120 includes motion clips 124 and registration curves 122. Motion clips 124 may be pre-defined motion clips created using a motion capture system. Alternatively, users of the rendering application 105 may create new motion clips 124 manually, e.g., by creating a sequence of frames one at a time. Motion clip 124 may include a sequence of frames of geometrical primitives such as points, lines, curves, and polygons that, collectively, depict character object 120 performing some form of motion. For example, motion clips 124 may include a sequence of frames that depict a wire-frame skeleton of human engaging in a walking motion. When a rendered animation clip is generated from motion clips 124, texture mapping may be used to give character object 120 a life-like appearance. As is known, texture mapping is a method of adding detail, surface texture, or color to a computer-generated graphic or model.

Registration curves 122 may be used to define the relationship between the frames of a first motion clip 124 and corresponding frames of a second motion clip 124 within a motion space. As is known, registration curve 122 provides a data structure specifying the relationships involving the timing, local coordinate frame, and constraints between frames in the first motion clip 124 and corresponding frames in the second motion clip 124. Registration curve 122 may be used to expand the range of motions that can be automatically blended from motion clips 124 to generate a rendered animation clip without requiring manual intervention. For example, one motion clip 124 may show a walking character turning 30 degrees to the right and a second motion clip 124 may show the character turning gradually 30 degrees to the left.

Registration curve 122 created for such a first and second motion clip 124 may be used in rendering animation frames blended from frames of the first and second motion clips 124. Further, depending on how frames from motion clips 124 are blended, the resulting animation sequence may show the character walking anywhere within the motion space between the two motion clips 124. That is, the resulting animation clip may show the character walking while gradually turning anywhere from one extreme (30 degrees right) to the other (30 degrees to the left), or to anywhere in between. Collectively, the range of blending available to render animation frames of character object 120 using motion clips 124 is referred to as a motion space. For additional examples related to the use of registration curves in computer graphics, see Kovar, L., and Gleicher, M. "Flexible automatic motion blending with registration curves." In Proceedings of ACM SIGGRAPH/Eurographics Symposium on Computer Animation (2003), incorporated by reference herein in its entirety.

Graphical user interface 110 provides tools used to manipulate character object 120. As shown, graphical user interface 110 includes motion clip processing tools 111, texture mapping tools 113, animated character motion editing tools 115, looping motion space generation tools 117, and goal space steering tools 119. Those skilled in the art will recognize, however, that the tools of GUI interface 110 shown in FIG. 1 are simplified to highlight aspects of the present invention and that a typical rendering application 105 and GUI interface 110 may include a broad variety of additional tools and features used to compose and manipulate an animated character object 120.

In one embodiment, motion clip processing tools 111 may provide GUI elements that allow a user to modify motion clips 124. Motion clip processing tools 111 may allow the user to define and modify physical, display, and meta properties of an animation clip 124 to be used and stored in a character object 120. As stated, motion clips 124 may provide a sequence of frames showing the character depicted by character object 120 performing some form of motion. Texture mapping tools 113 may allow a user to add detail, surface texture, or color to character object 120. For example, texture mapping tools 113 may allow a user to texture map a set of polygons to appear as a human character wearing a soccer uniform with hair, skin tone, and other appropriate features.

Animated character motion editing tools 115 may be used to manipulate motion clips 124 of character object 120. In the simplest example, a user may play the motion clip to view the motion of character object 120. In such a case, motion of character object 120 is simply the motion of motion clip 124. Alternatively, a user may wish to create a blended motion using two or more motion clips 120. In one embodiment, animated character motion editing tools 115 may be used to generate registration curve 122 between two motion clips 124. Once registered to one another, animated character motion editing tools 115 may be used to create a blended animation clip from motion clips 124. In one embodiment, a rendered animation clip may be generated in real-time. That is, the animation clip may be rendered from motion clips 124, where individual frames of the rendered animation sequence are blended together at a rate that allows blended frames to be presented as an ongoing animation. For example, a rendered animation clip may be generated in real-time to show a character in a video game walking or running from one location to another. In such a case, the direction and rate of turn (and hence the rate of blending between motion clips 124) may be controlled using goal space steering tools 119.

In one embodiment, looping motion space generation tools 117 may allow a user to generate an animation clip of character object 120 that extends the motion of character object 120 indefinitely. Each motion clip 124, and hence a looping motion space that includes motion clip 124, has a finite length. Thus, if a user generates an animation clip by blending the frames of two motion clips 124, the resulting sequence also has a finite length. In many applications that involve character animation, however, it is desirable to have character motion for an extended period of time. In many applications that involve character animation, especially NPC animation, it is desirable to have character motion for an extended period of time. This is often the case in video games where a character is constantly moving. Accordingly, embodiments of the invention provide a looping motion space that may be used to render character object 120 performing an arbitrary number of motion cycles, particularly periodic locomotion of character object 120, such as a human character, walking, jogging, or running, etc In one embodiment, a rendering application 105 may include goal space steering tools 119. A goal is a target to which a character desires to move. The goal can be either stationary or moving. Goal space steering tools 119 may vary the blending weight in a looping motion space to continuously turn a character in real-time towards a stationary (or moving) goal. That is, during rendering, goal space steering tools 119 may control the motion of character object 120 by determining the appropriate blending weights to use to generate frames of the rendered animation sequence. Due to the irregular curvature of blended motion clip paths, the relationship between blending weight and direction is not analytically computable. This is because each footstep taken by a motion captured performer (or a hand animated character) is not exactly along a circular arc, and the variation in path due to lateral shifts in balance and differences in stride length tend to create irregular deviations in path direction. Of course, these kinds are natural irregularities in motion are desirable since precise repetition would be perceived as being "robotic." In short, motion data cannot be described by a closed-form parametric equation that gives motion direction as a function of blending weight. Therefore, given the irregularity of the motion data, the general problem is to determine, for each frame of the rendered animation clip, the correct blending weight coefficients needed to steer a character toward a desired goal location.

Figure 4:
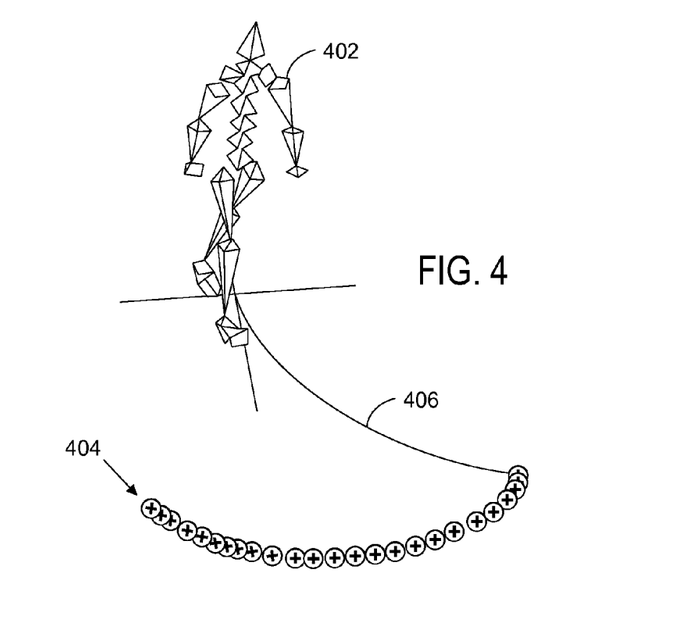
FIG. 4 illustrates a part of a goal space generated at a point in time given a starting blending, according to one embodiment of the invention.
Figure 5:
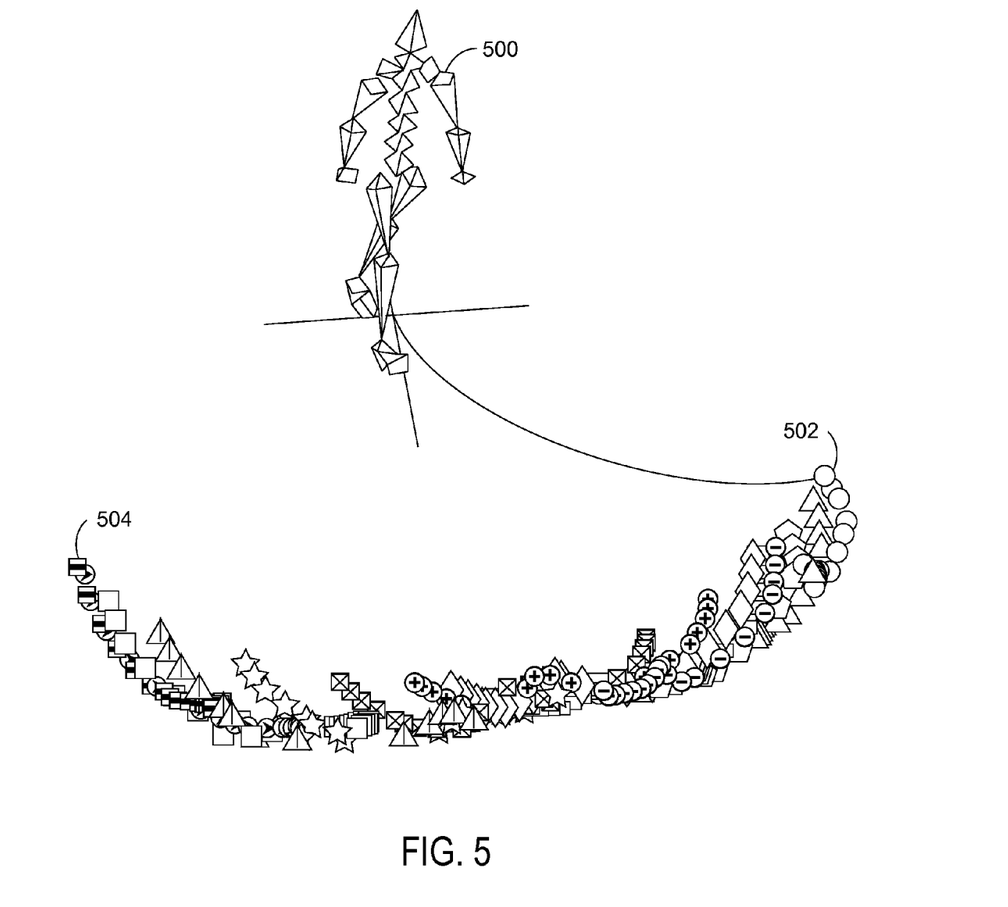
FIG. 5 illustrates an example portion of a goal space generated from a starting frame given a range of beginning blend values, according to one embodiment of the invention.

In one embodiment, goal space steering tools 119 may compute a "goal space." The goal space may include samples of possible future locations of the character object based on different starting frames in the motion space and on different starting blending weights. A motion space may be parameterized as a function of the current frame of the motion space and the current blending coefficients. Further, a future position of the character in the motion space may be a function of current position of the character, a current frame, a current blending weight, and a goal ending blending weight. For example, consider a looping motion space that includes a character walking through four steps with a turning range that allows the rendered character to appear to walk with a curve turning from 30 degrees to the right to 30 degrees to the left. The goal space could be computed for the character at each point in the looping motion space when the character's heel strikes the ground. And for each such point, a set of possible future positions of the character, some number of frames in the future, may be determined for a number of starting and ending blending weights. A visual example of such a goal space is shown in FIGS. 4 and 5.

Figure 2:
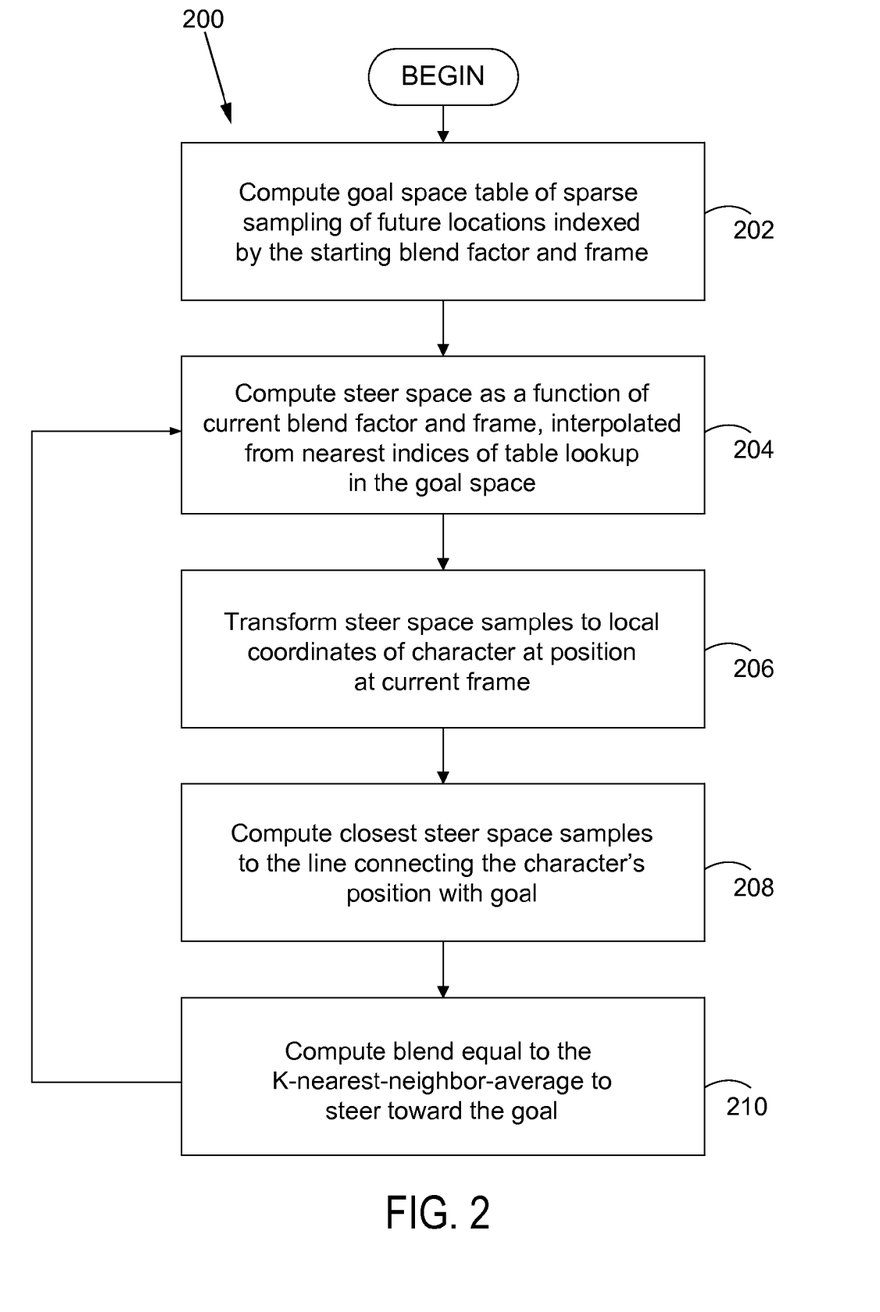
FIG. 2 is a flow chart illustrating a method for real-time goal space steering for rendering a character in an animation clip, according to one embodiment of the invention.

FIG. 2 is a flow chart illustrating a method 200 for real-time goal space steering for rendering a character in an animation clip, according to one embodiment of the invention. Persons skilled in the art will understand that even though the method is described in conjunction with the systems of FIG. 1, any system configured to perform the steps of the method illustrated in FIG. 2, in any order, is within the scope of the present invention. Further, persons skilled in the art will understand that the steps of the method described in FIG. 2 are only one embodiment of the present invention.

As shown, method 200 begins at step 202, where the rendering application may compute a goal space for a character depicted within a given motion space. As stated, the goal space may store possible future locations of the character based on a number of different "starting frames" (e.g., frames where a walking character's heel strikes the ground). The goal space may be stored in a table structure as a sparse distribution of samples. Such a goal space table may be indexed by a beginning blending weight and frame sequence number. For each "starting" frame, the goal space table may store a number of ending locations of the character that would result some number of frames in the future, based on different beginning and final blending weights.

For example, assume the goal space is defined to include "X" starting frames with "Y" beginning blend values and "Z" final blend values for a future ending time that is "F" frames in the future for each of the "X" starting frames. In such a case, the total number of future locations in the goal space is equal to X*Y*Z. For a looping motion space of a walking character where each loop has X=6 footsteps, the starting frames could correspond with the heel strikes of each of the six footsteps. For each footstep, the goal space table could include Z=25 different final blending weights future locations for Y=13 different starting blending weights. This results in a goal space with a total number of 6*25*13=1950 future positions, 325 for each of the 6 starting frames.

When the goal space table is computed, both the starting and final blending weights may span the full range of blending weights in the motion space. In one embodiment, during rendering, however, the blending weight may only be allowed to change by a fixed rate per frame, say 0.1 units. By constraining the rate of change in the blending value from any one frame to the next, the quality of the resulting animation sequence is improved as large changes in the blending weight may lead to rendered frames with visual artifacts where the character object appears to suddenly change direction in an unrealistic manner.

In one embodiment, the goal space table may be used during rendering to steer a character object towards a given goal position. Steps 204-208 illustrate a sequence of method steps that may be performed during rendering for each of the "X" "starting" frames represented in the goal space. Continuing with the example, above, the rendering application may calculate a blending value at each of the X=6 heel strike frames during rendering, (i.e., for each frame where the goal space includes a future position lookup). Note, however, each time a new blending value is determined it may take some time before frames are actually blended using that value. Instead, once determined, the rendering application may transition from a then current blending value to a new one over some number of frames.

At step 204, the rendering application may compute a "steer space" as a function of the current blend value and current frame. In one embodiment, the steer space may include a set of future locations of the character, determined from an interpolation of future positions in the goal space specified for the two "Y" beginning blending values that are closest to the actual current blending value being used to render animation frames. Continuing with the example, above, at a given heel strike frame, the rendering application selects a subset of the goal space that corresponds with that frame in the looped cycle. That is, if the goal space includes six "starting" frames, then the rendering application identifies which of the six footsteps is currently being processed. Additionally, the rendering application may further narrow the subset to the two closest Y=13 beginning blend values that are closest to the current blending value. This results in two "fans" of Z=25 future locations, one fan for each of the two "Y" beginning blend values. The rendering application may then interpolate the Z=25 future locations in each of the two fans based on its weighted relative proximity to the then current blend value. The resulting interpolated 25 future positions represent the steer space for the character. Visual examples of a steer space are shown in FIGS. 6-9.

In one embodiment, the interpolation may be performed using polar coordinates as the steer space is used in turning angle control. In an alternative embodiment, one of the "Y" beginning blend values (one fan) is selected rather than interpolating between the two closest "Y" beginning blend values (two fans). Generally, the positions in the steer space represent the future locations that may be reached by the character, based on the current actual position, actual blending value, and changes to the blending value. Thus, in the present example, the steer space equals Z=25 interpolated locations with each location corresponding to a different final blend value that spans from 0.0 (turning to the right) to 1.0 (turning to the left).

At step 206, the rendering application transforms the character positions in the steer space to local coordinates of the character position in the animation clip being rendered. That is, the steer space may represent the future positions in a coordinate system rooted on the character, and at step 206, these coordinates are transformed into the world space of a graphics scene. In one embodiment, the rendering application may compare the character's root position coordinate space with the character's starting position at the same heel-strike frame used to compute the goal subspace. A transform matrix may be then computed that aligns a goal location with the current character location. Applying the inverse of this matrix to the goal location may also be used to align the desired goal location with the steer space. Once transformed and aligned to the world space coordinates of a graphics scene, the future character positions included in the steer space may be compared against the desired goal location.

At step 208, the rendering application may determine which steer space samples are closest to the desired goal position. In one embodiment, the rendering application could simply find the two values closest to the goal using a linear distance calculation. Alternatively, as the steer space is used to change the turning direction of the character object, the rendering application could select the goal location(s) in the steer space that are closest to a line between the current character root location and the desired goal location.

At step 210, the blending coefficients of the closest steer space samples computed at step 208 are combined to compute the final blending coefficients. In one embodiment, a k-nearest neighbor average may be computed using two steer space samples. Alternatively, if only one steer space sample is used at step 208, the final blending coefficients may be the same as those in the computed "closest" steer space sample. The k-nearest-neighbor algorithm may be used to compute the weighted blends of the selected closest future locations in the steer space. With only k=2 locations, this calculation reduces to a simple linear interpolation based on relative proximity.

Figure 3:
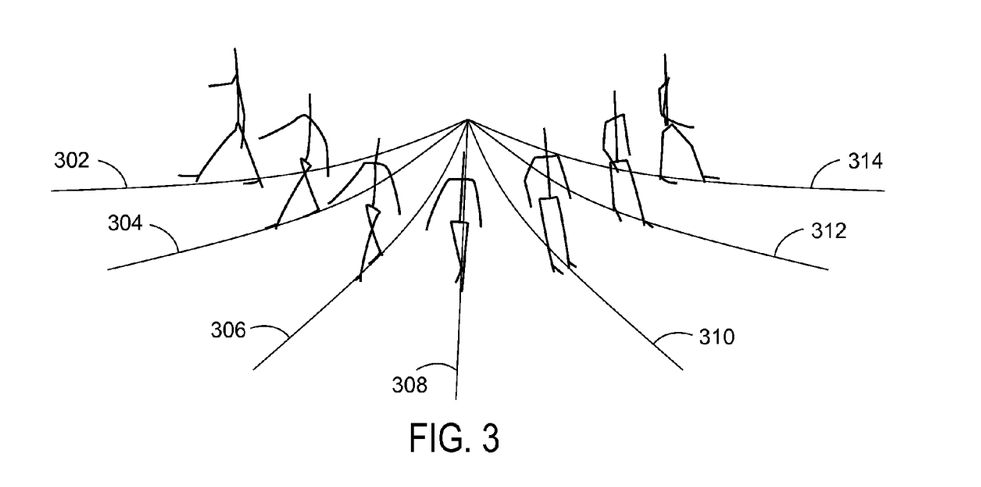
FIG. 3 illustrates a motion space that includes seven motion clips of a skeletal figure, according to one embodiment of the invention.

FIG. 3 illustrates a motion space that includes seven motion clips of a skeletal figure, according to one embodiment of the invention. As shown, clip 302 illustrates the skeletal figure walking at an angle turning to the right. Clip 314 illustrates the skeletal figure walking at an angle to turning the left. Clips 304, 306, 308, 310, 312 illustrate the skeletal figure while turning at different rates between the extremes of clips 302, 314. In one embodiment, the rendering application may use a registration curve to blend frames from clips 302 through 314 to create a rendering of the skeletal figure walking through this motion space. Generally, the path of the rendered character is bound by motion space created by motion clips 302 through 314.

FIG. 4 illustrates an example portion of a goal space generated from a starting frame, given a starting blending value, according to one embodiment of the invention. In this case, the starting frame corresponds to one of the X=6 frames where a heel of a character 402 strikes the ground and one of the Y=13 beginning blend values. A fan 404 shows the possible future locations of character 402, based on this starting frame and beginning blend value. That is, fan 404 shows each of the "Z=25" future positions for character 402 from the goal space computed for this motion space for the particular X and Y values. Each possible future location depends on a different final blending value. Illustratively, the future locations are shown in FIG. 4 using a "+" symbol inside a circle. The distance from character 402 to any point in fan 404 is based on pre-defined number of frames F in the future. For this example assume fan 404 represents the position of character 402 where F=40 frames in the future from the given "starting" frame. A path 406 shows the path that character 402 takes for one of the sampled final blending weights in the goal space.

FIG. 5 illustrates an example portion of a goal space generated from a starting frame given a range of beginning blend values, according to one embodiment of the invention. Like FIG. 4, FIG. 5 corresponds to one of the X=6 frames where a heel of a character 500 strikes the ground. Each fan of the goal space is represented by a set of symbols based on one of the Y=13 beginning blend values. Thus, each fan represents a set of Z=25 ending blend value for a given starting blending value. In this example, future positions are shown for each of the Y=13 different starting blend values, so there are 13 differently symbol-coded "fans" of future locations. Each differently symbol-coded fan depicts the Z=25 possible future locations that character 500 can reach in F=40 frames, given a different beginning blend value.

For example, if the beginning blend value caused a character 500 to steer as far to the left as possible (from the perspective of character 500), then a fan 502 (symbolized by empty circles) represents Z=25 the future positions for character 500. The fan symbolized by empty circles 502 has a right-most possible future location at a point near the middle of the motion space. This occurs because character 500 cannot reach the right-most side of the motion space within a distance of F=40 frames. This is done to maintain a realistic rendering. If a character could reach any point in the motion space within F=40 frames, that would cause the character to have an unnatural rotation when turning towards an extreme side of the motion space. Similarly, a fan 504 (symbolized by strike-through squares) represents the Z=25 possible future locations of character 500 if the beginning blend value caused character 500 to turn sharply to the right. Like fan 502, fan 504 does not extend to the other extreme side of the motion space. Each other fan of symbols in this goal space represents a set of possible future positions of character 500 based on a different one of the Y=13 beginning blend values.

Figure 6:
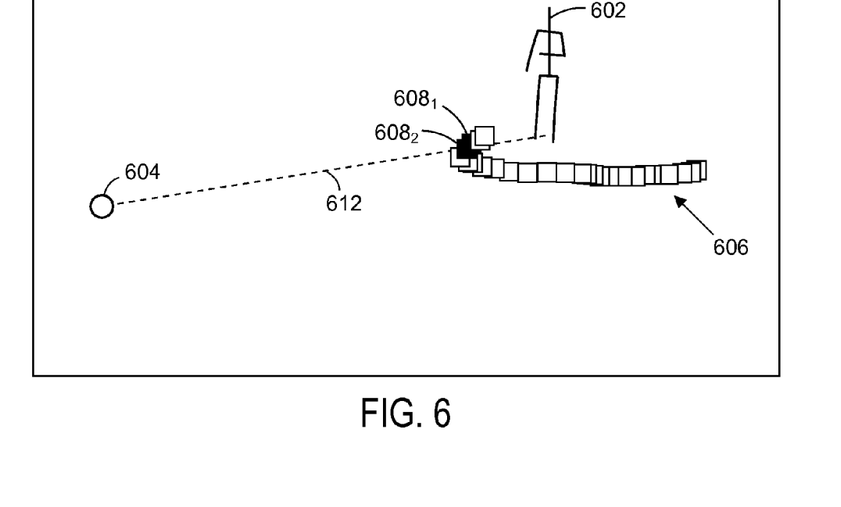
FIG. 6 illustrates a character, a goal, and an oriented steer space, according to one embodiment of the invention.

FIG. 6 illustrates a character 602, a goal 604, and an oriented steer space 606, according to one embodiment of the invention. Assume for this example that character 602 is being steered toward goal 604 by rendering character 602 using a looping motion space. Steer space 606 is shown as a fan of points representing different possible future locations of character 602. Each point may represent an interpolated location between two goal space fans (e.g., two of the symbol-coded fans shown in FIG. 5). That is, steer space 606 may represent an interpolation of the two fans in the goal subspace which have a beginning blend value that is closest to the current actual blend value being used to render character 602. Alternatively, the points in steer space 606 may represent a fan of the goal subspace with a beginning blending value that is closest to the actual current blend value being used to render character 602. In this example, of the Z=25 possible future locations in steer space 606, boxes $608_{1-2}$ represent the two that are the closest to a line 612, connecting character 602 and goal 604. In one embodiment, the blending coefficients corresponding to boxes $608_{1-2}$ are interpolated to determine a new final blending value to use in rendering character 602. Alternatively, the blending value corresponding to the single point in steer space 606 closest to line 612 (e.g., box 6082) may be used. In yet another embodiment, the point in steer space 606 closest to goal 604 may be used as a basis for computing a final blending weight. In either case, such a blending value may be used until the next "starting" frame is reached, i.e., until a frame is reached where the goal space table includes a future position lookup, at which time the blending value may be recomputed.

Figure 7:
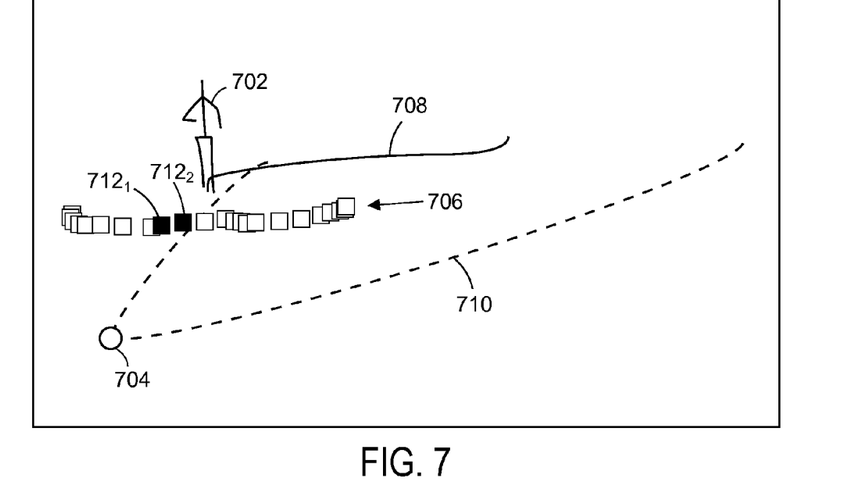
FIG. 7 illustrates a character, a goal, and an oriented steer space, according to one embodiment of the invention.

FIG. 7 illustrates a character 702, a goal 704, and an oriented steer space 706, according to one embodiment of the invention. As shown, character 702 is running towards goal 704. In this example, a curve 708 represents a path that character 702 has traversed during previously rendered frames. Also, a curve 710 represents movement of a goal position 704. Assume that character 702 has reached the next X=6 "starting frame" for which goal space data is available. Accordingly, steer space 706 has been computed based on the current "starting" frame and relevant fans of the goal space. Character 702 may be steered towards goal 704 by interpolating a new blending weight based on the two possible future locations in steer space 706 that are nearest to the line connecting character 702 and goal 704, represented by boxes $712_{1-2}$. Like the previous blending value, the new blending value may be used until the next "starting" frame is reached.

Figure 8:
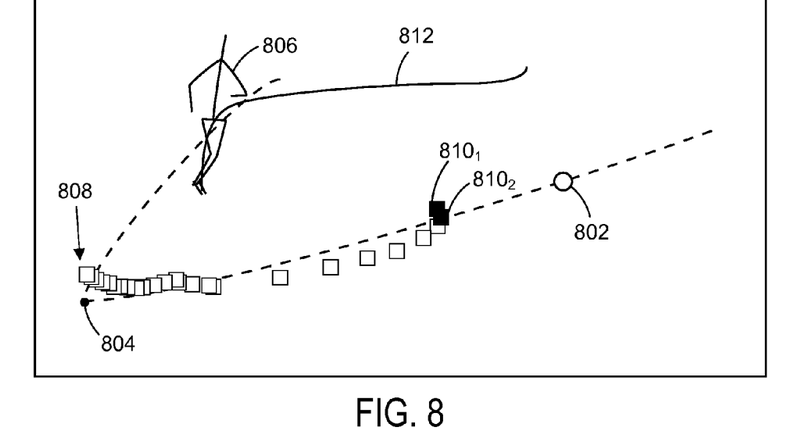
FIG. 8 illustrates a character, a goal, and an oriented steer space, according to one embodiment of the invention.

FIG. 8 illustrates a character 806, a goal 802, and an oriented steer space 808 at a later moment in time, according to one embodiment of the invention. A curve 812 represents a path that character 806 has traversed during previously rendered frames, i.e., using the blending value computed in FIG. 7. As shown, goal 802 has sharply changed the direction in which it is moving at point 804. Character 806 reacts to this new goal location by turning to the left and moving toward goal 802. As described, character 806 may be steered by changing the blending value used to render character 806 as it moves through a motion space. In this example, steer space 808 is not well aligned with goal 802 (i.e., the best blending values are not found in the center of the steer space). This occurs as the points in steer space 808 are computed from the two starting blend values in the goal space closest to the character's current blend value, as described above in conjunction with method 200 of FIG. 2. For this reason, points $810_{1-2}$ of steer space 808 are used to interpolate the new blending value, as points $810_{1-2}$ are closest to a line between position of character 806 and goal 802. Specifically, points $810_{1-2}$ are the two future locations at the left-most side of steer space 808, representing the point furthest to the left that character 806 can reach in the number of frames between the current frame and the frame represented by the future locations of the steer space 808.

Figure 9:
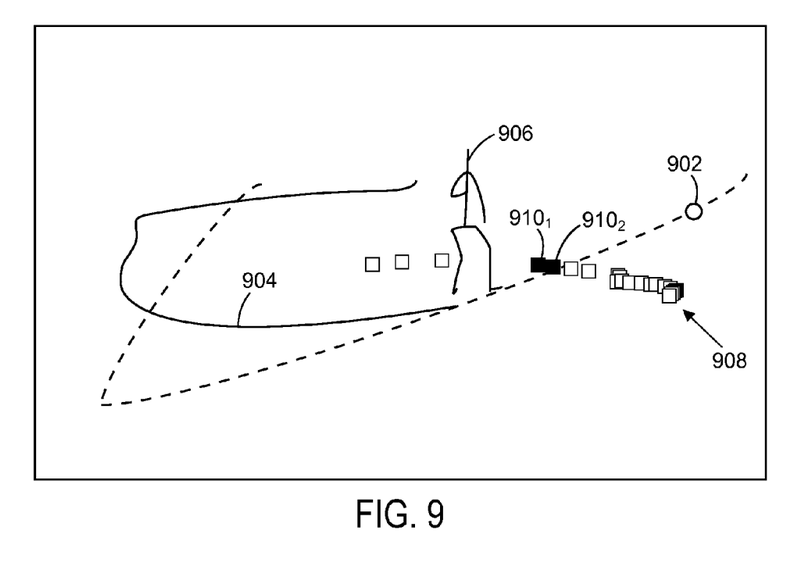
FIG. 9 illustrates a character, a goal, and an oriented steer space, according to one embodiment of the invention.

FIG. 9 illustrates a character 906, a goal 902, and an oriented steer space 908 at yet a later moment in time, according to one embodiment of the invention. A curve 904 represents a path that character 906 has traversed during previously rendered frames, i.e., using the blending value computed in FIGS. 7 and 8. When compared to steer space 808 of FIG. 8, steer space 908 is more aligned with goal 902, i.e., the center of steer space 908 is relatively in line with goal 902. This occurs because character 906 has turned to follow the movement of goal 902 and can now head in a relatively straight forward direction to reach goal 902. As shown, two points $910_{1-2}$ are used to interpolate a new blending value for rendering character 906. As character 906 has turned towards goal 902 during previously rendered frames, e.g., based on the blending value computed in FIG. 8, points $910_{1-2}$ are located relatively near the center of steer space 908.

As described, embodiments of the invention allow users to generate real-time goal space steering for data-driven character animation. A goal space table of sparse samplings of possible future locations is computed, indexed by the starting blend value and frame. A steer space is computed as a function of the current blend value and frame, interpolated from the nearest indices of the table lookup in the goal space. The steer space is then transformed to local coordinates of a character's position at the current frame. The closest steer space samples to a line connecting the character's position with the goal are selected. The blending values of the two selected steer space samples are interpolated to compute the final blending used to render subsequent animation frames of the character.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A method of rendering frames of an animation sequence using a plurality of motion clips included in a motion space, wherein each of the plurality of motion clips depicts a character performing a sequence of motion, the method comprising:

generating a goal space, wherein the goal space includes, for at least one starting frame, a plurality of possible future locations of the character computed from a plurality of beginning blending values and the at least one starting frame;

while rendering a frame of the animation sequence based on a first blending value at the at least one starting frame, determining that a next frame to be rendered corresponds to the least one starting frame; and generating a second blending value by:
determining, from the goal space, a plurality of possible future locations of the character in a steer space that includes at least two of the possible future locations of the character in the goal space, wherein the plurality of possible future locations of the character in the steer space are selected based upon which beginning blending values in the plurality of beginning blending values are closest to the first blending value,
transforming the plurality of possible future locations of the character in the steer space to a local coordinate space of a graphics scene, and
determining, from the plurality of possible future locations of the character in the steer space and a goal location included in the graphics scene, the second blending value to use in rendering subsequent frames of the animation sequence to steer the character towards the goal location, wherein a path traversed by the character towards the goal location is different than one or more points defining a path traversed by the goal location.

2. The method of claim 1, wherein the second blending value is interpolated from at least two of the plurality of future locations of the character in the steer space.

3. The method of claim 2, wherein the at least two of the plurality of future locations of the character used to interpolate the second blending value are the two future locations in the steer space closest to a line formed by connecting the character and the goal location.

4. The method of claim 1, wherein the second blending value is computed by selecting a blending value associated with the possible future location of the character in the steer space that is closet to a line formed by connecting the character and the goal location.

5. The method of claim 1, wherein the second blending value is computed by selecting a blending value associated with the possible future location of the character in the steer space that is a shortest distance from the goal location.

6. The method of claim 1, wherein determining the steer space comprises:
identifying at least two beginning blending values in the goal space that are closest to the first blending value; and
determining the plurality of possible future locations of the character in a steer space by interpolating positions of the character specified in the goal space for the at least two beginning blending values.

7. The method of claim 1, wherein determining the steer space comprises:
identifying a beginning blending value in the goal space closest to the first blending value; and
selecting a plurality of future positions in the goal space for the identified beginning blending value.

8. The method of claim 1, wherein the motion space is a looping motion space, wherein each of the motion clips depicts a looping motion of the character performing an equal number of motion cycles, and wherein first frames across each of the motion clips are synchronized so that the motion cycles across each of the plurality of motion clips are in phase with one another.

9. The method of claim 1, further comprising texture mapping the character depicted in the frames of the rendered animation sequence.

10. The method of claim 1, wherein the first blending value is incrementally changed to the second blending value by a specified amount for each successively rendered frame of the animation sequence.

11. The method of claim 1, further comprising, for a frame that follows the next frame, generating a third blending value to use in rendering subsequent frames of the animation sequence to steer the character towards the goal location, wherein the third blending value is based on the a second plurality of possible future locations of the character in a second steer space and the goal location.

12. A non-transitory computer-readable storage medium storing instructions that when executed by a processor cause the processor to render frames of an animation sequence using a plurality of motion clips included in a motion space, wherein each of the plurality of motion clips depicts a character performing a sequence of motion, by performing the steps of:

generating a goal space, wherein the goal space includes, for at least one starting frame, a plurality of possible future locations of the character computed from a plurality of beginning blending values and the at least one starting frame;

while rendering a frame of the animation sequence based on a first blending value at the at least one starting frame, determining that a next frame to be rendered corresponds to the least one starting frame; and generating a second blending value by:
determining, from the goal space, a plurality of possible future locations of the character in a steer space that includes at least two of the possible future locations of the character in the goal space, wherein the plurality of possible future locations of the character in the steer space are selected based upon which beginning blending values in the plurality of beginning blending values are closest to the first blending value,
transforming the plurality of possible future locations of the character in the steer space to a local coordinate space of a graphics scene, and
determining, from the plurality of possible future locations of the character in the steer space and a goal location included in the graphics scene, the second blending value to use in rendering subsequent frames of the animation sequence to steer the character towards the goal location, wherein a path traversed by the character towards the goal location is different than one or more points defining a path traversed by the goal location.

13. The computer-readable storage medium of claim 12, wherein the second blending value is interpolated from at least two of the plurality of future locations of the character in the steer space.

14. The computer-readable storage medium of claim 13, wherein the at least two of the plurality of future locations of the character used to interpolate the second blending value are the two future locations in the steer space closest to a line formed by connecting the character and the goal location.

15. The computer-readable storage medium of claim 12, wherein the second blending value is computed by selecting a blending value associated with the possible future location of the character in the steer space that is closet to a line formed by connecting the character and the goal location.

16. The computer-readable storage medium of claim 12, wherein the second blending value is computed by selecting a blending value associated with the possible future location of the character in the steer space that is a shortest distance from the goal location.

17. The computer-readable storage medium of claim 12, wherein determining the steer space comprises:
   identifying at least two beginning blending values in the goal space that are closest to the first blending value; and
   determining the plurality of possible future locations of the character in a steer space by interpolating positions of the character specified in the goal space for the at least two beginning blending values.

18. The computer-readable storage medium of claim 12, wherein determining the steer space comprises:
   identifying a beginning blending value in the goal space closest to the first blending value; and
   selecting a plurality of future positions in the goal space for the identified beginning blending value.

19. The computer-readable storage medium of claim 12, wherein the motion space is a looping motion space, wherein each of the motion clips depicts a looping motion of the character performing an equal number of motion cycles, and wherein first frames across each of the motion clips are synchronized so that the motion cycles across each of the plurality of motion clips are in phase with one another.

20. The computer-readable storage medium of claim 12, wherein the steps further comprise texture mapping the character depicted in the frames of the rendered animation sequence.

21. The computer-readable storage medium of claim 12, wherein the first blending value is incrementally changed to the second blending value by a specified amount for each successively rendered frame of the animation sequence.

22. The computer-readable storage medium of claim 12, further comprising, for a frame that follows the next frame, generating a third blending value to use in rendering subsequent frames of the animation sequence to steer the character towards the goal location, wherein the third blending value is based on the a second plurality of possible future locations of the character in a second steer space and the goal location.

23. A method of rendering frames of an animation sequence, the method comprising:
   selecting a plurality of motion clips to include in a motion space, wherein each of the plurality of motion clips depicts a character performing a sequence of motion; and
   invoking a rendering tool configured to:
      generate a goal space, wherein the goal space includes, for at least one starting frame, a plurality of possible future locations of the character computed from a plurality of beginning blending values and the at least one starting frame,
      while rendering a frame of the animation sequence based on a first blend value at the at least one starting frame, determining that a next frame to be rendered corresponds to the least one starting frame, and
      generate a second blending value by:
         determining, from the goal space, a plurality of possible future locations of the character in a steer space that includes at least two of the possible future locations of the character in the goal space, wherein the plurality of possible future locations of the character in the steer space are selected based upon which beginning blending values in the plurality of beginning blending values are closest to the first blending value,
         transforming the plurality of possible future locations of the character in the steer space to a local coordinate space of a graphics scene, and
         determining, from the plurality of possible future locations of the character in the steer space and a goal location included in the graphics scene, the second blending value to use in rendering subsequent frames of the animation sequence to steer the character towards the goal location, wherein a path traversed by the character towards the goal location is different than one or more points defining a path traversed by the goal location.

24. The method of claim 23, wherein the second blending value is interpolated from at least two of the plurality of future locations of the character in the steer space.

25. The method of claim 24, wherein the at least two of the plurality of future locations of the character used to interpolate the second blending value are the two future locations in the steer space closest to a line formed by connecting the character and the goal location.

26. The method of claim 23, wherein the second blending value is computed by selecting a blending value associated with the possible future location of the character in the steer space that is closet to a line formed by connecting the character and the goal location.

27. The method of claim 23, wherein the second blending value is computed by selecting a blending value associated with the possible future location of the character in the steer space that is a shortest distance from the goal location.

28. The method of claim 23, wherein determining the steer space comprises:
   identifying at least two beginning blending values in the goal space that are closest to the first blending value; and
   determining the plurality of possible future locations of the character in a steer space by interpolating positions of the character specified in the goal space for the at least two beginning blending values.

29. The method of claim 23, wherein determining the steer space comprises:
   identifying a beginning blending value in the goal space closest to the first blending value; and
   selecting a plurality of future positions in the goal space for the identified beginning blending value.

30. The method of claim 23, wherein the motion space is a looping motion space, wherein each of the motion clips depicts a looping motion of the character performing an equal number of motion cycles, and wherein first frames across each of the motion clips are synchronized so that the motion cycles across each of the plurality of motion clips are in phase with one another.

31. The method of claim 23, wherein the rendering tool is further configured to texture mapping the character depicted in the frames of the rendered animation sequence.

32. The method of claim 23, wherein the first blending value is incrementally changed to the second blending value by a specified amount for each successively rendered frame of the animation sequence.

33. The method of claim 23, further comprising, for a frame that follows the next frame, generating a third blending value to use in rendering subsequent frames of the animation sequence to steer the character towards the goal location, wherein the third blending value is based on the a second plurality of possible future locations of the character in a second steer space and the goal location.

* * * * *

UNITED STATES PATENT AND TRADEMARK OFFICE
CERTIFICATE OF CORRECTION

PATENT NO. : 8,730,246 B2  
APPLICATION NO. : 11/833890  
DATED : May 20, 2014  
INVENTOR(S) : Michael Girard Page 1 of 1

It is certified that error appears in the above-identified patent and that said Letters Patent is hereby corrected as shown below:

In the Claims:

Column 11, Claim 4, Line 54, please delete "closet" and insert --closest-- therefor;

Column 13, Claim 15, Line 13, please delete "closet" and insert --closest-- therefor;

Column 14, Claim 26, Line 38, please delete "closet" and insert --closest-- therefor.

Signed and Sealed this  
Twenty-sixth Day of August, 2014

Michelle K. Lee  
*Deputy Director of the United States Patent and Trademark Office*